United States Patent [19]

Takamatsu et al.

[11] 4,309,814
[45] Jan. 12, 1982

[54] MANUFACTURE OF A MULTI-LAYERED LIQUID CRYSTAL DISPLAY PANEL

[75] Inventors: Toshiaki Takamatsu, Tenri; Shigehiro Minezaki, Ikoma; Masataka Matsuura, Tenri; Hisashi Uede, Yamatokoriyama, both of Japan

[73] Assignee: Sharp Kabushiki Kaisha, Osaka, Japan

[21] Appl. No.: 113,337

[22] Filed: Jan. 18, 1980

[30] Foreign Application Priority Data

Jan. 20, 1979 [JP] Japan .................................. 54-5718

[51] Int. Cl.³ .............................................. G02F 1/13
[52] U.S. Cl. .................................. 29/592 R; 350/341; 427/154
[58] Field of Search ........................ 29/592; 427/154; 350/341

[56] References Cited

U.S. PATENT DOCUMENTS

| 3,864,021 | 2/1975 | Katagiri et al. | 29/592 |
| 4,071,639 | 1/1978 | Palmer et al. | 427/154 |
| 4,083,099 | 4/1978 | Yano et al. | 29/592 |

*Primary Examiner*—Jimmy C. Peters
*Attorney, Agent, or Firm*—Birch, Stewart, Kolasch and Birch

[57] ABSTRACT

A method for making a multi-layered liquid crystal display panel is provided herein. More particularly, the method enables double-sided rubbing on at least one of a plurality of stacked glass supports and avoids possible flaws in a rubbed surface through the utilization of a protective coating covering the rubbed surface, thus providing liquid crystal display panels with excellent image quality. The protective coating is of sufficient mechanical strength and easily removable by means of a remover.

6 Claims, 4 Drawing Figures

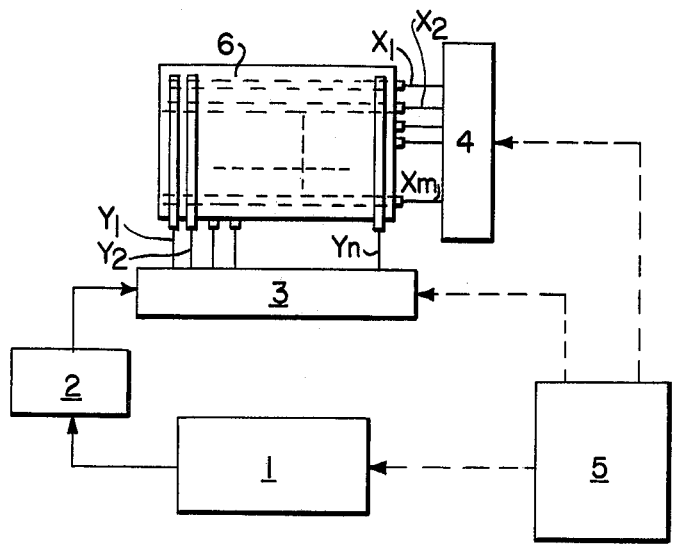
FIG. 1 PRIOR ART
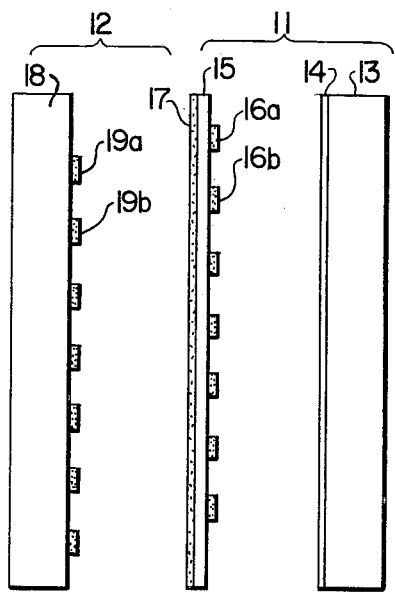
FIG. 2 PRIOR ART
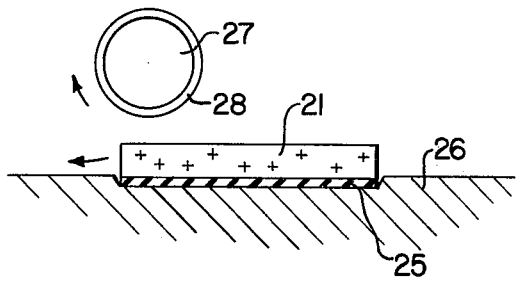
FIG. 3
FIG. 4

MANUFACTURE OF A MULTI-LAYERED LIQUID CRYSTAL DISPLAY PANEL

BACKGROUND OF THE INVENTION

This invention relates to the manufacture of a multi-layered liquid crystal display panel.

In recent years, a substantial amount of effort in the field of liquid crystal matrix displays has been devoted to the development of a high-density multi-line display, aiming at an improvement in image quality. Liquid crystal displays with matrix-shaped electrode structures are quite favorable to fulfill a power saving demand because of their capability of being excited with low power consumption.

One way in which the above-mentioned matrix type liquid crystal displays are excited is the line sequential scan method as depicted in FIG. 1, for example. After characters, symbols and so forth are converted into desired display patterns via a character signal converter 2 and loaded into a buffer memory in a column drive circuit 3 row by row with respect to a display screen a main storage 1 supplies its outputs to row electrodes $Y_1$, $Y_2 \ldots Y_n$, respectively. The information thus stored in the buffer memory appears on the display screen row by row. A control circuit 5 commands the column drive circuit 3 and a row drive circuit 4. As stated above, a liquid crystal display panel 6 has a matrix type electrode structure.

For the matrix type liquid crystal display panel the greater the number of the rows (scanning line number), the higher the density and accuracy of display. However, with an increase in the number of the rows, the length of time at which a signal is applied per column, a duty factor, would be shortened and the problem arises that crosstalk takes place. In particular, liquid crystal display devices show dull threshold characteristics and slow response characteristics, resulting in difficulty in obtaining satisfactory contrast. There are several attempts to overcome these problems:

(1) The development of liquid crystal material having more definite threshold properties,
(2) A matrix address scheme in the optimum condition with an extended operating margin ($\alpha = V_{on}/V_{off}$), and
(3) The design of an electrode structure with a seemingly higher resolution.

Though the first two attempts (1) and (2) do not need to modify largely the well known structure of liquid crystal cells, it appears almost impossible to increase drastically the number of excitable lines from the viewpoint of the present-day progress of liquid crystal materials, etc. Contrarily, the last method (3) has the problem that liquid crystal cells are complicated in construction but is actually possible to increase the number of excitable lines twice, three times, four times and so forth.

Typical ways of making possible the last approach (3) are as follows:

(a) double electrode structure
(b) vertical partition, and
(c) two-layered structure.

Those ways may be adopted alone or in combination for achieving the purpose. Such combination has been proposed by co-pending application Ser. No. 921,062 filed June 30, 1978, MATRIX TYPE LIQUID CRYSTAL DISPLAY PANEL by F. Funada et al.

OBJECTS AND SUMMARY OF THE INVENTION

The present invention belongs to the field of the manufacture of liquid crystal displays and more particularly to a method for successfully depositing alignment coatings on two major surfaces of an intermediate glass sheet defining two or more layers of liquid crystal composition in making a multi-layered liquid crystal display panel using the above mentioned approach (3), (c).

FIG. 2 shows in a cross-sectional view an example of a conventional, multi-layered, matrix type liquid crystal display panel. Two liquid crystal cells 11 and 12 of the TN-FEM (twisted-nematic field effect mode) type are stacked such that respective ones of column electrodes 14 are disposed on a front glass sheet 13 of one of the two cells as denoted by 11 on the viewer's side while respective ones of row electrodes 16a, 16b, . . . are disposed on the front surface of an intermediate glass sheet 15. Moreover, as regards the other liquid crystal cell 12, respective ones of column electrodes 17 are disposed at the rear surface of the intermediate glass sheet 15 and respective row electrodes 19a, 19b, . . . are disposed on a rear glass sheet 18.

The row electrodes 16 and 19 of the liquid crystal cells 11 and 12 are aligned in such a manner as not to overlap with each other while the column electrodes 14 and 17 exactly overlap with each other. The inner surfaces of the liquid crystal cells 11 and 12 are subjected to a conventional molecular alignment process and eventually the injection of a liquid crystal composition, thus completing the manufacture of a multi-layered matrix type liquid crystal display panel.

Rubbing or slant evaporation are well known as the above mentioned molecular alignment process and the former is more advantageous over the latter for mass production and treatment of large size glass sheets. It is, however, greatly difficult or impossible to carry out rubbing on both opposed surfaces of the intermediate glass sheet 15 when the conventional rubbing process is applied to the multilayered liquid crystal cells 11 and 12. In other words, although rubbing is possible on one surface of the intermediate glass sheet 15, the one surface already rubbed is susceptible to flaws which in turn may disturb the molecular alignment, while the other surface is being rubbed. This deteriorates the quality of a visual display provided by the liquid crystal display panel.

With the foregoing in mind, it is an object of the present invention to provide a new and useful method for making a multi-layered liquid crystal display panel, which method avoids possible flaws in a rubbed surface through the utilization of a protective coating covering the rubbed surface, thus providing liquid crystal display panels with excellent image quality.

BRIEF DESCRIPTION OF THE DRAWINGS

For a more complete understanding of the present invention, along with the objects and advantages thereof, reference is now made to the following description taken in conjunction with the accompanying drawings, in which:

FIG. 1 is a schematic diagram of a drive circuit arrangement for a conventional matrix type liquid crystal display panel;

FIG. 2 is a schematic representation of the structure of an exploded conventional multi-layered liquid crystal panel; and FIGS. 3 and 4 are cross-sectional views for explanation of one preferred embodiment of the present invention.

FIGS. 1 and 2 relating to conventional systems have been discussed above.

DETAILED DESCRIPTION OF PREFERRED EMBODIMENT OF THE INVENTION

Referring now to the accompanying drawings, there is illustrated one preferred embodiment of the present invention in detail. FIG. 3 is a cross-sectional view of a two-layer structure liquid crystal display panel for explanation of the one embodiment of the present invention.

A front glass sheet 20 and an intermediate glass sheet 21 define a front liquid crystal cell while the intermediate glass sheet 21 and a rear glass sheet 22 define a rear liquid crystal cell. An appropriate sealant 23 is disposed on the peripheries of the respective glass sheets 20, 21 and 22, hermetically sealing the interior surrounded by the glass sheets. A liquid crystal composition 24 is injected into the front and rear liquid crystal cells respectively. Molecular alignment is achieved by rubbing in a well known manner, for example, as taught by U.S. Pat. No. 4,083,099, issued Apr. 11, 1978, entitled MANUFACTURE OF A TWISTED NEMATIC FIELD EFFECT MODE LIQUID CRYSTAL DISPLAY CELL, owned by the applicant of this application. Whereas the inner surfaces of the front and rear glass sheets 20 and 22 are rubbed in such a conventional manner, the intermediate glass sheet 21 is rubbed in the following manner pursuant to the teachings of the present invention. In other words, subsequent to the completion of the conventional rubbing process on one surface of the intermediate glass sheet 21, that rubbed surface is covered by a protective coating 25 as seen in FIG. 4 such as a well known photoresist coating (for example, AZ-1350 available from Shipley Far-East). A way of painting the rubbed surface with the protective coating 25 is the spinner method, the roll coating method, etc. for the purpose of the present invention. Following the deposition of the protective coating 25, the coating 25 is baked at a temperature of 80° C. for 20 minutes in order to drive off the solvent of the coating and strengthen the coating 25 itself. After the intermediate glass sheet 21 is cooled, another surface of the intermediate glass sheet is rubbed by means of a roller 27 with a polishing cloth 28, with the surface protected by the protective coating 25 being mounted on a base support 26. After the completion of the both-sided rubbing, the protective coating 25 is removed from the intermediate glass sheet 21 by use of such a remover as acetone. As noted earlier, the above procedure enables both-sided rubbing and results in the two flaw-free rubbed surfaces of the intermediate glass sheet 21.

It will be noted that no photo-sensitivity is necessarily required for the protective coating 25. The protective coating 25 should not be limited to the above suggested photoresist coating and may include any other types of protective coatings which are of a sufficient physical strength and relatively easily removable with a remover with no adverse effects on the delicate molecular alignment. Another example of a protective coating now available is silicon resin, SILITECT, by Controlyne Inc.

As stated above, the present invention is powerful in preventing the occurrence of flaws due to the vibrating movement of the base support during rubbing, thus providing multi-layered liquid crystal display panels which are free of problems with inferior molecular alignment and provides a quality visual display. It is evident that the present invention is applicable not only to the matrix type of liquid crystal displays but also to any other types which require double-sided rubbing.

Whereas the present invention has been described with respect to specific embodiments thereof, it will be understood that various changes and modifications will be suggested to one skilled in the art, and it is intended to encompass such changes and modifications as fall within the scope of the appended claims.

We claim:

1. A method for making a multi-layered liquid crystal display which comprises a plurality of liquid crystal cells defined on a plurality of stacked supports and a liquid crystal composition injected into each of the respective liquid crystal cells, said method comprising the steps of:

rubbing one surface of one support of said plurality of supports for ensuring proper molecular alignment thereon, said one support requiring rubbing on both of its surfaces for molecular alignment to satisfy the requirements of the multi-layered crystal display;

overlaying said rubbed surface of said one support with a protective coating; and subsequently rubbing another surface of said one support for ensuring proper molecular alignment thereon while said already rubbed surface of said one support is covered by said protective coating, thereby completing treatment for molecular alignment on both sides of said one support.

2. A method according to claim 1, wherein said protective coating is of sufficient physical strength to provide the required protection and is easily removable by means of a remover without adversely effecting the respective delicate molecular alignments.

3. A method according to claim 1 further including the step of baking said protective coating so as to increase the physical strength thereof before rubbing said other surface of said one support.

4. A method for preparing a multi-layered liquid crystal display panel having a plurality of liquid crystal cells defined by a plurality of stacked supports, each of said respective liquid crystal cells containing a liquid crystal composition said method comprising:

providing a support for said display panel which is to serve as an intermediate support of said plurality of stacked supports, rubbing one surface of said intermediate support so as to insure proper molecular alignment on said surface, depositing a protective coating on said rubbed surface of said intermediate support;

rubbing the opposite surface of said intermediate support thereby insuring proper molecular alignment on said surface without disturbing the molecular alignment of the previously rubbed and now coated surface of said intermediate support and thereafter fabricating said plurality of supports including said intermediate support into said multi-layered liquid crystal display panel.

5. The method of claim 4 wherein said intermediate support comprises a glass sheet.

6. The method of claim 4 further including the step of removing said protective coating from said rubbed surface of said intermediate support prior to the fabrication of said multi-layered liquid crystal display panel.

* * * * *